UNITED STATES PATENT OFFICE.

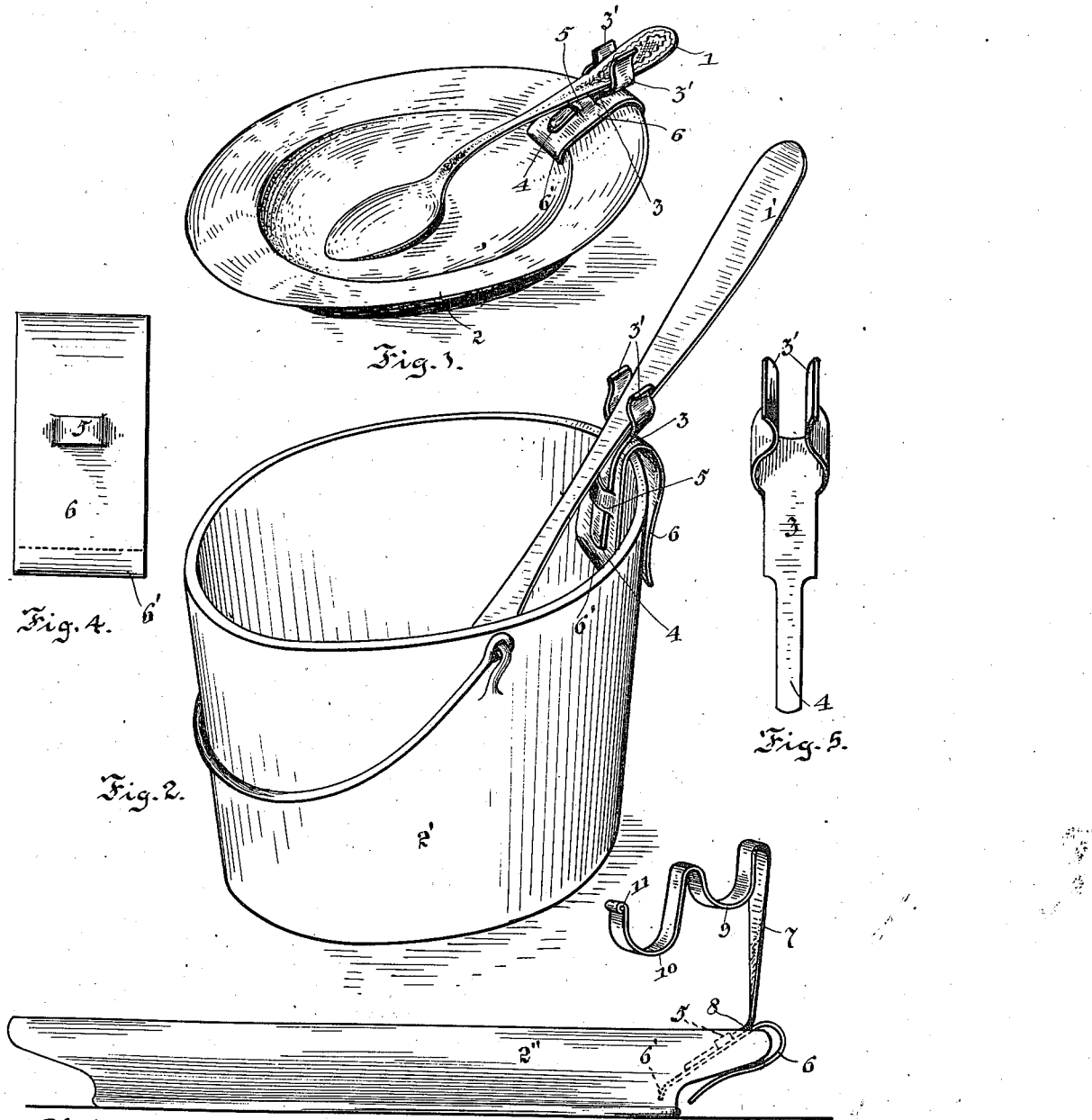

ROSS C. GUY, OF CHICAGO, ILLINOIS.

KNIFE, FORK, AND SPOON HOLDER.

975,858.

Specification of Letters Patent. Patented Nov. 15, 1910.

Application filed March 7, 1910. Serial No. 547,731.

*To all whom it may concern:*

Be it known that I, Ross C. Guy, a citizen of the United States, residing at Chicago, county of Cook, and State of Illinois, have invented certain new and useful Improvements in Knife, Fork, and Spoon Holders, of which the following is a specification.

My invention relates to improvements in knife, fork and spoon holders, the object of the invention being the production of a portable device of this character which can be readily applied to the edge of a plate, dish or other vessel, and, when desired, detached from the same.

A further object of my invention is to provide a holding device which shall be inexpensive to manufacture and neat in appearance.

Other objects will appear hereinafter.

With these objects in view my invention consists in the novel construction and arrangement of parts which will be hereinafter fully described and particularly pointed out in the appended claims.

My invention will be best understood by reference to the accompanying drawing forming a part of this specification, and in which, Figure 1 is a perspective view showing a teaspoon holder attached to a plate, Fig. 2 is a perspective view showing a holder attached to a kettle and the handle of a large spoon resting therein, Fig. 3 is a side elevation of a platter showing a knife and fork holder attached thereto, Fig. 4 is a side elevation of the clip portion of the holder, and Fig. 5 is a side elevation of a spoon rest adapted to engage said holder.

Referring now to the drawings, 1 designates a teaspoon and 2 an ordinary plate, the former being held in position in the spoon rest or support 3. The spoon rest is formed of flexible sheet metal and comprises a central portion having parallel edges and a reduced portion 4 forming a tongue which also has parallel edges. The other end of the spoon rest is formed into a substantially U-shaped fork 3' having outturned ends, the purpose of which is to readily receive and hold a spoon in position, as shown in Fig. 1. The tongue 4 is formed to snugly fit into the loop 5 which is struck up in the flexible sheet metal clip 6 which is formed substantially U-shaped for embracing the rim of the plate 2. In order to hold the clip 6 more securely in position an inwardly turned end 6' is formed on the inner side thereof or the side in which the loop 5 is struck up. This end is adapted to engage over an angle of the plate as shown in Fig. 1.

The spoon holder shown in Fig. 2 is substantially the same as that shown in Fig. 1 except that it is designed to be attached to a kettle 2' or other similar vessel for holding a large mixing spoon 1'.

The knife and fork holder is shown attached to a platter 2', the same clip 6 being used as for the spoon rests shown in Figs. 1 and 2. The knife and fork rest comprises a vertically disposed twisted support 7 from which extends a tongue 8 formed similar to the tongue 4 and adapted to engage the loop 5. The tongue 8 is inclined to the support 7 as shown by dotted lines in Fig. 3. The upper end of the support 7 is bent inwardly but not radially of the platter, the support 7 being twisted to accomplish this result. Thus when a knife and fork are supported in the rests therefor the same will naturally be positioned adjacent the edge of the platter and not on the food contained therein. Said inwardly bent portion comprises two U-shaped loops 9 and 10 for the reception of a knife and fork respectively, the extremity of the latter being bent into a small loop 11 to render the same more finished in appearance.

It will be noted that the loop 10 extends down farther than the loop 9, but when a fork is placed therein that the end of the fork handle will not be higher than the end of the knife handle, the fork being shorter will obviously be inclined at a greater angle than the longer knife.

While I have shown what I deem to be the preferable form of my invention I do not wish to be limited thereto as there might be various changes made in the details of construction and arrangement of parts described, and hence I desire to avail myself of such modifications as fairly fall within the spirit and scope of the appended claims.

Having described my invention what I claim as new and desire to secure by Letters Patent is:

1. In a device of the class described, a flexible substantially U-shaped clip adapted to engage the rim of a vessel, a struck up loop in said clip, a utensil supporting member, and a tongue formed in said member and adapted to engage said loop, substantially as described.

2. In a device of the class described, a substantially U-shaped clip and a loop struck up therein, a twisted vertically disposed utensil support having a tongue inclined thereto and adapted to engage said loop, and two loops integral with said support and arranged on the same side thereof, substantially as described.

In testimony whereof I have signed my name to this specification in the presence of two subscribing witnesses.

ROSS C. GUY.

Witnesses:
  HELEN F. LILLIS,
  JOSHUA R. H. POTTS.